United States Patent [19]
Sohmuta

[11] Patent Number: 5,623,461
[45] Date of Patent: Apr. 22, 1997

[54] OPTICAL DISK DRIVE CAPABLE OF HIGHER-SPEED SEEKING

[75] Inventor: Mitoshi Sohmuta, Tokyo, Japan

[73] Assignee: NEC Corporation, Japan

[21] Appl. No.: 571,591

[22] Filed: Dec. 13, 1995

[30] Foreign Application Priority Data

Dec. 15, 1994 [JP] Japan ...................... 6-311597

[51] Int. Cl.$^6$ ...................................... G11B 7/08
[52] U.S. Cl. .................. 369/32; 369/44.28; 360/78.05; 360/78.06
[58] Field of Search ...................... 369/32, 44.28, 369/44.29, 44.27, 44.32, 44.34, 44.35, 47, 48, 54, 58, 59, 43; 360/69, 75, 77.02, 78.01, 78.04, 78.05, 78.06

[56] References Cited

U.S. PATENT DOCUMENTS 5,268,883  12/1993  Yamaguchi et al. ...................... 369/32
5,319,623  6/1994  Yamada et al. ...................... 369/32 X

*Primary Examiner*—Muhammad N. Edun
*Attorney, Agent, or Firm*—Hayes, Soloway, Hennessey, Grossman & Hage, P.C.

[57] ABSTRACT

An optical disk drive has a rough actuator for moving an optical head with respect to an optical disk and a fine actuator for moving an object lens with respect to the optical head, to transfer an optical spot from a present address to a target address. The optical disk drive controls the radial speed of an optical spot based on a trapezoidal speed profile. A deceleration period is effected when the remaining track number is at a threshold value. During the deceleration period when a rough actuator moves the optical head, fine actuator is moved in the direction opposite to the moving direction of the optical head to generate a stationary state of the optical spot. An address detector is activated during the stationary state to read the present address, thereby correcting the remaining track number. When the rough actuator is stopped, the seeking operation is completed without an additional fine seeking operation.

5 Claims, 9 Drawing Sheets

OPTICAL DISK DRIVE CAPABLE OF HIGHER-SPEED SEEKING

BACKGROUND OF THE INVENTION (a) Field of the Invention

The present invention relates to an optical disk drive capable of higher-speed seeking and, more particularly, to an optical disk drive capable of higher-speed seeking by controlling a fine actuator during a deceleration period of a rough actuator.

(b) Description of the Related Art

Optical disk drives for driving a compact disk (CD) or a compact disk read-only memory (CD-ROM) has an optical head irradiating an optical spot on a rotating disk file on which each data track includes data pits for read-out. The optical head detects the levels of intensity of a reflected light from the data pits, thereby reading data recorded on the disk file.

In CD drives or CD-ROM drives (hereinafter, simply referred to as CD drives), since the recording density of the optical disk file as viewed along a data track is constant over the whole track area in spite of radial position of the data track on the optical disk file, the linear speed of the disk file must be maintained constant by changing the rotational speed thereof depending on the radial position of the data track. The linear speed data for respective tracks are stored beforehand in the CD drives. The CD drives calculate the number of tracks to be crossed during a seeking operation based on the linear speed data stored beforehand, the address data of the present location (present address), on which the optical spot stays, and the address data of the target track (target address) included in the access command. The CD drives then move the optical spot to the target address based on the calculation.

FIG. 1 shows a seeking process effected by a conventional optical disk drive. After the optical disk drive receives an access command in step S43, the optical disk drive reads out the present address Tp in step S44. Subsequently, the optical disk drive first calculates radial position $r_1$ of the present address Tp as viewed from the disk center, by using the following equation:

$$r_1 = \sqrt{(V_L \cdot Tp \cdot tp)/\pi + r_o^2} \quad (1)$$

wherein $r_o$, tp and $V_L$ are radial position of the minimum address from which the data is stored, the track pitch of the disk file and the linear speed at the present address, respectively. Thereafter, radial position $r_2$ of the target address Tt also calculated by using the following equation:

$$r_2 = \sqrt{(V_L \cdot Tt \cdot tp)/\pi + r_o^2} \quad (2)$$

wherein $V_L$ is the linear speed at the target track. Based on the results, the number Nt of the tracks (cross-track number Nt) disposed between the present address before seeking and the target address is obtained in step S45 by using the following equation:

$$Nt = (r_2 - r_1)/tp. \quad (3)$$

The optical disk drive then moves the optical head based on the cross-track number Nt in a rough seeking operation, which is shown by steps S46 to S56. The rough seeking operation is effected based on a speed profile, such as shown in FIG. 2, including a first, acceleration period between t0 and t1, a second, constant speed period between t1 and t2 and a third, deceleration period between t2 and t3. In short, the rough seeking operation is controlled based on a so-called trapezoid speed profile.

During the acceleration period, the travelling speed of the optical head is raised up to a maximum speed Vmax, which is not higher than the critical speed below which the tracking error signal can be detected. After the maximum speed Vmax is obtained at time instant t1, the maximum speed Vmax is maintained, then deceleration period begins at the radial position where the number of the remaining tracks to be crossed hereinafter, i.e., remaining track number is at a threshold value, at time instant t2. The movement of the optical head is finished at the position where the remaining track number is zero at time instant t3.

In detail, after the remaining track number becomes a threshold value Nd, the speed V of the optical head for the deceleration period is calculated by using the cross-track number Nt and the count Nc of the crossed tracks (crossed-track count Nc) in step S51 as follows:

$$V = Vmax \cdot \sqrt{(Nt - Nc) \cdot Nd} \quad (4)$$

After the remaining track number Nt–Nc becomes zero at step S53, the rough actuator is stopped in step S55, then the tracking servo system is activated to read the present address data to finish the rough seeking operation in step S56.

In the conventional method, however, the location at which the rough seeking operation is finished often deviates from the target track due to errors in results of calculation of the linear speed or in the tracking error signal. Accordingly, read-out of the present address and a fine seeking operation follow the rough seeking operation. In detail, as shown in FIG. 3, one seeking operation includes the steps of receiving an access command (step S57), rough seeking (step S58), read-out of the present address (step S59), fine seeking (step S60), additional read-out of the present address (step S61) and awaiting disk rotation (step S63). The read-out can be executed by activating the tracking servo system during a stationary state of the optical spot. The fine seeking operation is effected to position the optical spot exactly at the target address and thereby requests the read-out of the present address before the fine seeking and a subsequent calculation of a second cross-track number in step S59.

In the conventional method, as described above, there is a limit for obtaining a higher-speed seeking to thereby reduce the access time for the optical spot because of a number of the sequential steps of rough seeking, read-out of present address, fine seeking etc.

SUMMARY OF THE INVENTION

In view of the foregoing, an object of the present invention is to provide an improved optical disk drive capable of reducing access time of the optical spot.

In accordance with the present invention, there is provided an optical disk drive comprising an optical head for reading optical data stored along a plurality of tracks of a disk file, a first actuator for moving the optical head with respect to the disk file in a radial direction thereof, an object lens, mounted on the optical head, for irradiating an optical spot onto the disk file, a second actuator, mounted on the optical head, for moving the object lens with respect to the optical head in the radial direction, a speed sensor for detecting a radial speed of the optical spot with respect to the disk file, an address detector for detecting a present address of the optical spot with respect to the disk file, the second actuator moving the object lens in the direction opposite to the moving direction of the optical head for controlling the radial speed of the optical spot to thereby generate a stationary state of the optical spot with respect to the disk file, the address detector being activated to read a present address during the stationary state of the optical spot.

BRIEF DESCRIPTION OF THE DRAWINGS

Other and further objects, features and advantages of the present invention will be more apparent from the following description, referring to the accompanying drawings in which.

DESCRIPTION OF THE PREFERRED EMBODIMENTS

Now, embodiments of the present invention will be described with reference to the drawings.

Figure 4:
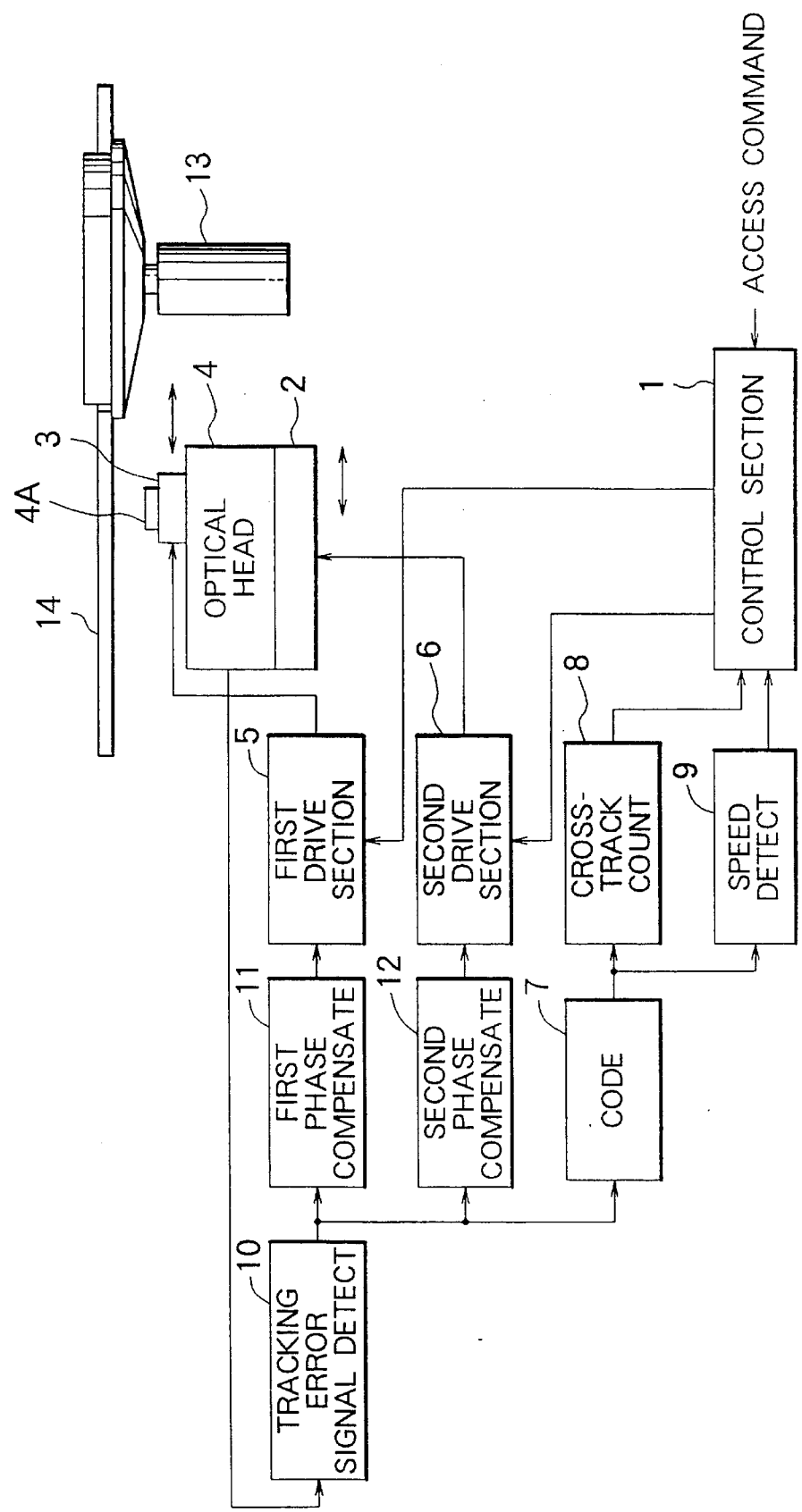
FIG. 4 is a block diagram of an example of an optical disk drive according to the present invention.

Referring to FIG. 4, an example of an optical disk drive according to the present invention includes an optical head 4 for reading data stored in an optical disk file 14 rotatably mounted on a spindle motor 13, a tracking control system for positioning an optical spot onto a target track of the optical disk file 14, and a reproducing section (not shown in the drawing) for processing data read-out by the optical head. The optical spot is irradiated from an object lens 4A movably mounted on the optical head 4.

The tracking control system includes a rough actuator (first actuator) 2 for moving the optical head 4 in a radial direction of the optical disk file, a fine actuator (second actuator) 3 for moving the object lens 4A with respect to the optical head 4 in the radial direction, a signal detecting section 10 for generating a tracking error signal "a" based on the data read-out by the optical head 4 from the disk file 14, a first and a second phase compensating sections 11 and 12 each for compensating the tracking error signal "a" in the phase thereof to generate a driving signal for a corresponding one of the actuators 2 and 3, a coding section 7 for coding the tracking error signal "a" supplied from the signal detecting section 10, a first drive section 5 for driving the fine actuator 3 based on the output of the first phase compensating section 11, a second drive section 6 for driving the rough actuator 6 based on the output of the second phase compensating section 12, a cross-track counter 8 for counting pulses of the coded cross-track signal "b" supplied from the coding section 7 to thereby generate a crossed-track count, a speed detecting section or speed sensor 9 for detecting the travelling speed of the optical spot based on the pulse repetition interval of the coded tracking error signal "b", and a control section 1 for controlling the first and second drive sections 5 and 6 based on the travel distance supplied from the cross-track counter 8 and the travelling speed supplied from the speed detecting section 9.

In general, the term "fine actuator" includes an object lens actuator for moving an object lens with respect to an optical head in the vertical direction of the disk file and a tracking servo actuator for moving the object lens with respect to the optical head in the radial direction of the disk file. In this text, however, the fine actuator 3 is defined as a tracking servo actuator for a simplification purpose.

The rough actuator 2 generally for a long distance use moves the optical head 4 with respect to the disk file, while the fine actuator 3 generally for a small distance use moves the object lens 4A with respect to the optical head 4. The cross-track counter 8 is reset by the control section 1 before the optical spot moves or before the counting of the crossed tracks is started.

Figure 1:
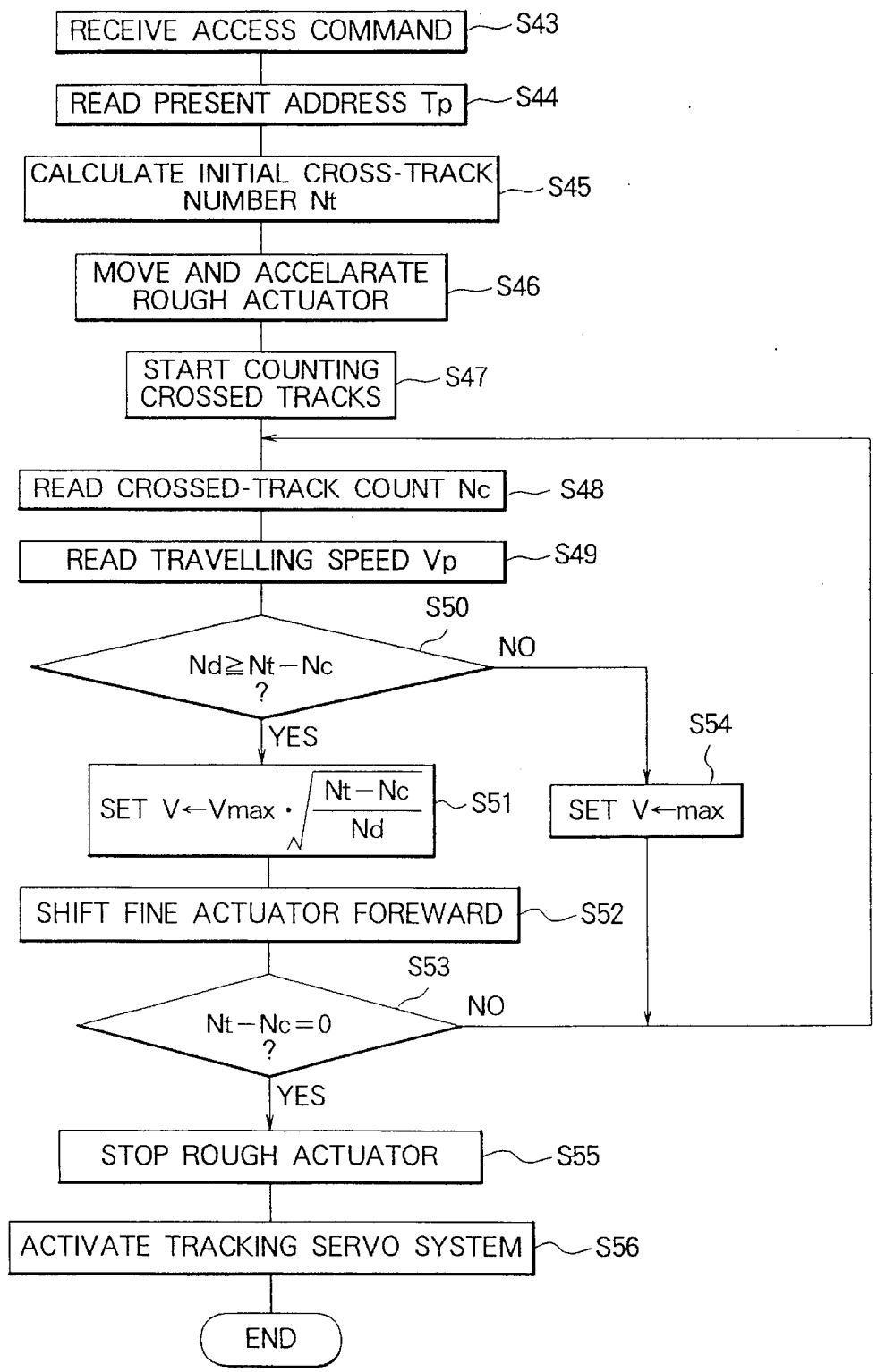
FIG. 1 is a flowchart showing a seeking process for a rough seeking effected by a conventional optical disk drive.
Figure 5:
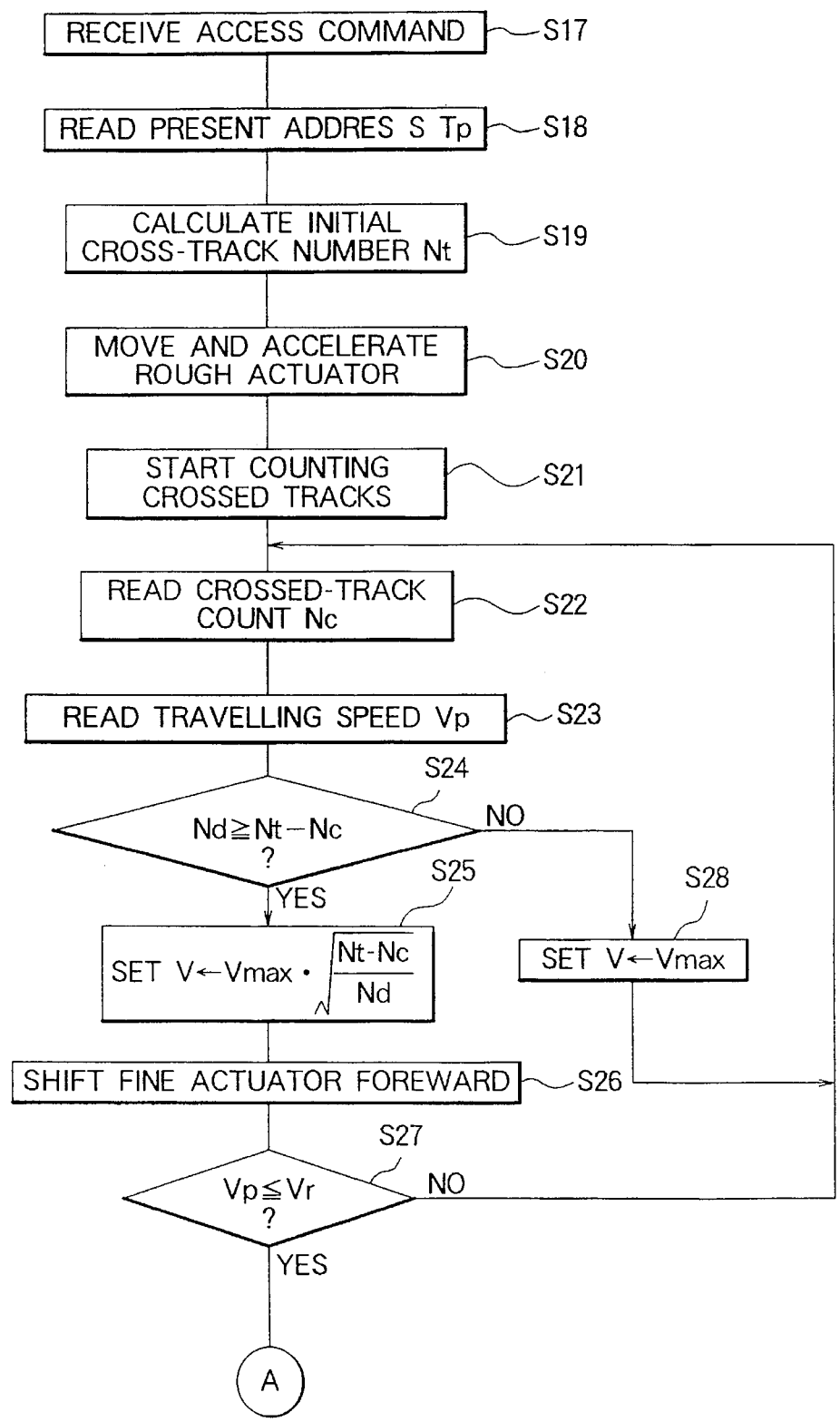
FIG. 5 is a first part of a flowchart for a seeking process effected by the optical disk drive of FIG. 3, showing a first embodiment of the present invention.
Figure 6:
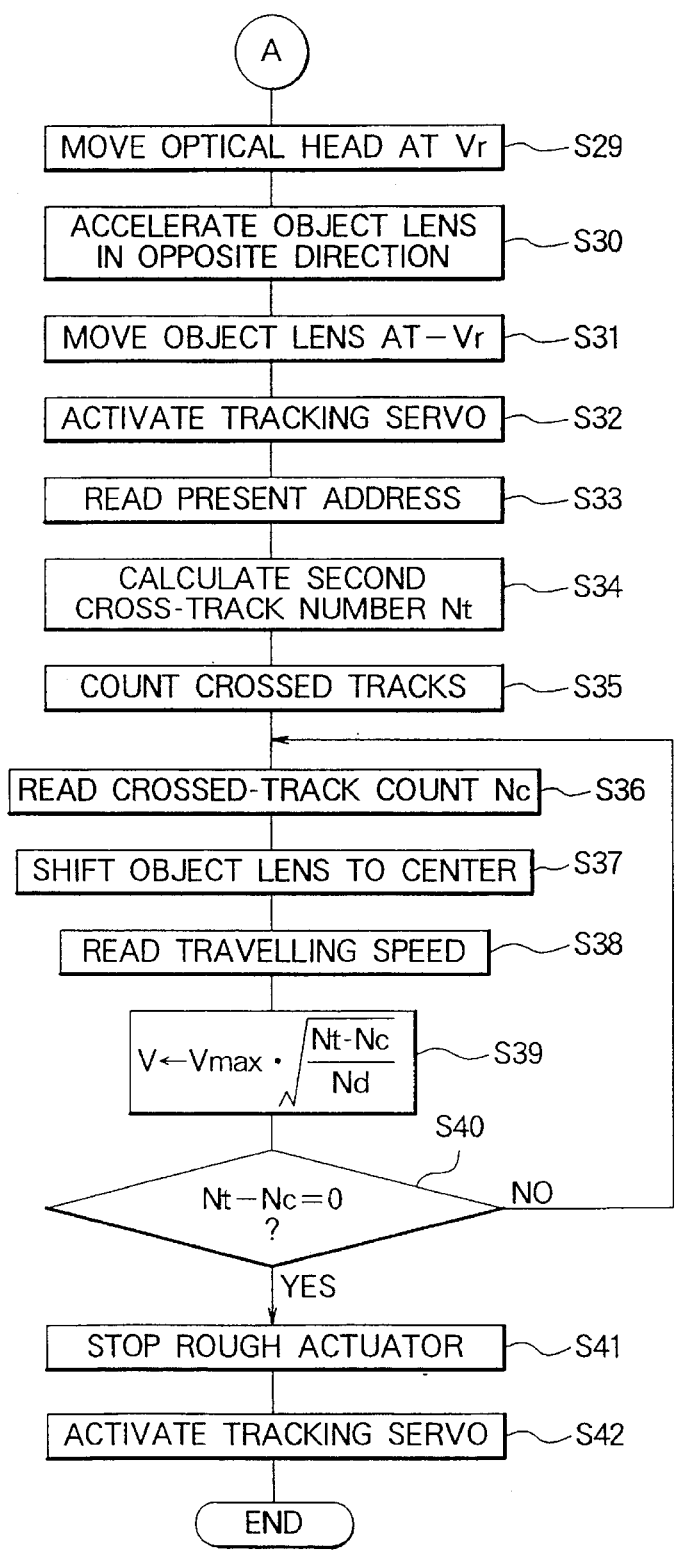
FIG. 6 is a remaining part of the flowchart of FIG. 5.

FIGS. 5 and 6 as combined show a flowchart of a seeking process effected by an optical disk drive according to a first embodiment of the present invention such as shown in FIG. 1. After the control section 1 receives an access command including a target address data in step S17, the control section 1 reads out in step S18 the present address Tp of the location on which the optical spots stays. Subsequently, the number Nt of tracks to be crossed during seeking travel from the present address to the target address, i.e., initial cross-track number Nt is calculated in step S19. The control section 1 then controls the first drive section 5 based on the initial cross-track number Nt to drive the rough actuator 2, thereby moving the optical head 4 in a radial direction in step S20. The control section 1 resets the crossed-track count in the cross-track counter 8, which starts to count up crossed-tracks in step S21, which is crossed by the optical spot during the seeking operation.

Figure 7:
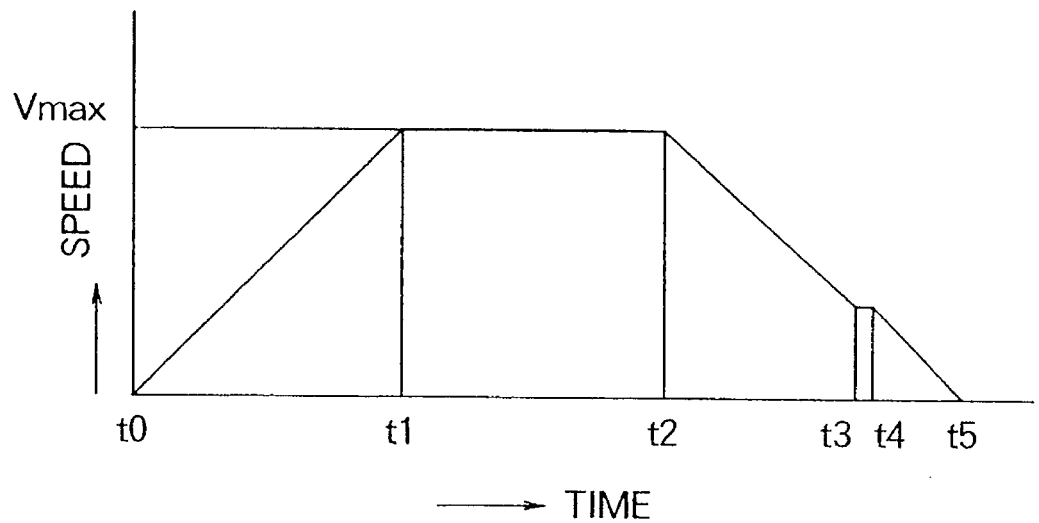
FIG. 7 is a graph for showing a speed profile obtained by the seeking operation of FIGS. 5 and 6.
Figure 8:
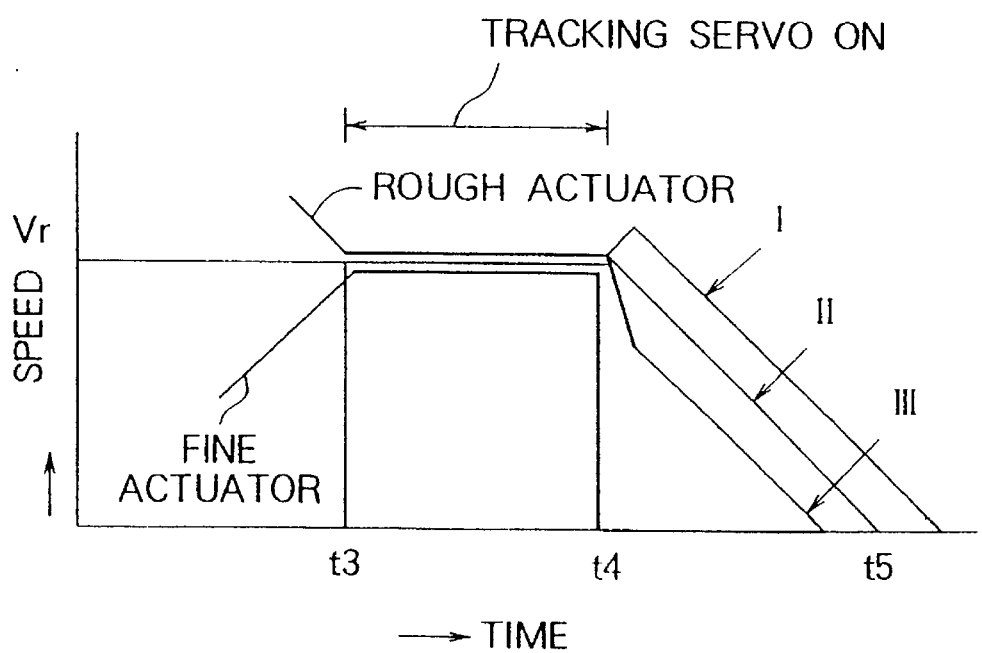
FIG. 8 is a graph for showing detailed speed profiles effected by a rough actuator and a fine actuator.

FIG. 7 shows a speed profile of the optical spot effected by the seeking process of FIGS. 5 and 6, while FIG. 8 shows a magnified, detailed speed profiles effected by the rough actuator and by the fine actuator during a final stage of the speed profile of FIG. 7. In FIG. 7, during an acceleration period between t0 and t1, the rough actuator 2 accelerates the optical head up to the maximum speed Vmax at the maximum acceleration rate. The maximum speed Vmax is set at a speed in the vicinity of the critical maximum speed, for example, 0.5 m/s below which the tracking error signal can be effectively detected.

Figure 2:
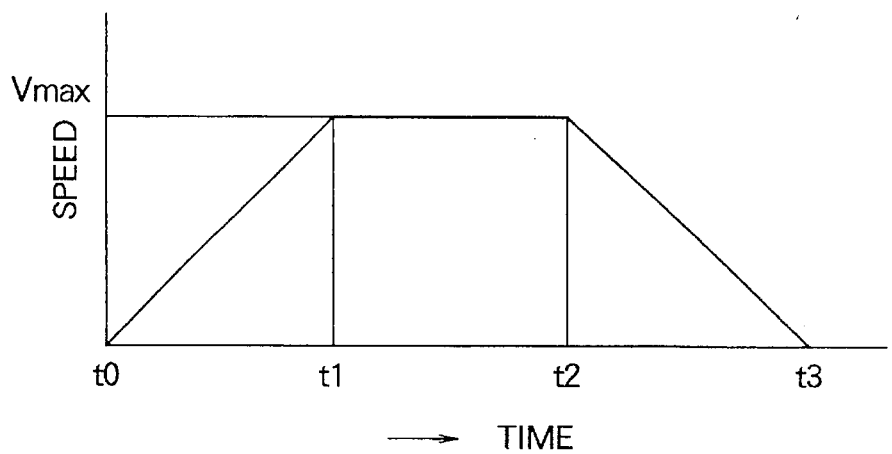
FIG. 2 is a graph showing a speed profile of the optical spot during the rough seeking of FIG. 1.
Figure 3:
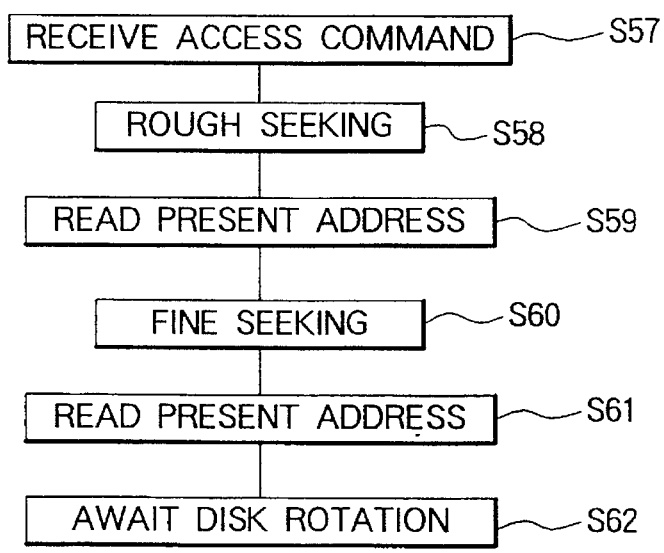
FIG. 3 is a flowchart showing one seeking operation in the conventional optical disk drive.

After the travelling speed of the optical spot (or optical head) effected by the rough actuator 2 reaches the maximum speed Vmax, the control section 1 reads out the crossed-track count Nc in step S22 and travelling speed in step S23, then controls the rough actuator 2 to move the optical head 4 at a constant speed equal to Vmax before the number of the remaining tracks (remaining track number: Nt–Nc) becomes equal to a threshold number Nd at t2. The threshold number Nd for remaining tracks can be calculated in FIG. 2 by dividing the area below the profile between t2 and t3 by the track pitch of the disk file.

When the remaining track number Nt–Nc to be crossed before reaching the target track becomes equal to or lower than the threshold Nd in step S24 at time instant t2, the control section 1 calculates the travelling speed of the optical head to be effected by the rough actuator for the subsequent period, by using equation (4) in step S25. In this way, the speed of the optical head effected by the rough actuator is decreased. At the same time, the object lens is shifted by the fine actuator 3 with respect to the optical head to the forward end of the stroke for the object lens, as viewed in the travelling direction of the optical lead in step S26.

After the travelling speed Vp of the optical head effected by the rough actuator 2 is decreased down to a threshold speed Vr in step S27, the control section 1 maintains the travelling speed of the optical spot at Vr in step S29 of FIG. 6. The threshold speed Vr is calculated by taking into consideration the travel stroke by the rough actuator, acceleration characteristic of the rough actuator, and the time period required for read-out of the present address. The threshold speed Vr is generally set between 0.05 to 0.1 m/s.

Subsequently, the control section 1 controls the fine actuator 3 to move and accelerate the object lens in a direction opposite to the travelling direction of the optical head in step S30, then maintains the travelling speed of the object lens effected by the fine actuator 3 at −Vr in step S31, as shown in FIG. 8. As a result, the travelling speed of the optical spot, which is the relative speed of the object lens with respect to the disk file, becomes approximately zero, so that the tracking servo system for detecting the present address of the optical spot can be effectively activated.

During the on-state of the tracking servo system, i.e., during time period between t3 and t4, the control section 1 reads out the present address of the optical spot in step S33, then again calculates a second cross-track number Nt between the present address obtained in step S33 and the target address in step S34. Thereafter, the control section 1 calculates the travelling speed for the next time period for deceleration in steps S35 through S40 based on the second cross-track number Nt.

In detail, the crossed-track count is first reset to zero in step S35, then the cross-track counter starts to count the crossed tracks in step S36 to obtain a crossed-track count. The fine actuator is moved back to the center of its stroke in step S37 or at any time. The travelling speed Vp of the optical spot is then read out. The travelling speed by the rough actuator for the next stroke is revised based on the equation:

$$V = Vmax \cdot \sqrt{(Nt - Nc)/Nd} \quad (5)$$

in step S39. The remaining track number Nt−Nc is examined whether it is zero or not in step S40. If the remaining track number Nt−Nc is not zero in step S40, the process goes back to step S36 to repeat the steps S36 through S40. The cycle of the steps S36 through S40 is repeated until the remaining track number Nt−Nc becomes zero. If it is detected that the remaining track number Nt−Nc is zero in step S40, it means that the optical spot is positioned at the target track. Accordingly, the rough actuator is stopped in step S41 and tracking servo system is activated again in step S42 to assure that the present address is the target address, thereby ending the seeking process.

As described above, the travelling speeds effected by the rough actuator and the fine actuator during time interval t3 and t4 are equal to each other but in opposite direction, to thereby provide a substantially zero travelling speed of the optical spot. If the second cross-track number Nt is larger or smaller than the expected remaining track number at that time, the speed profile to be effected by the rough actuator for the time interval between t4 and t5 is corrected from the expected profile II in FIG. 8. Accordingly, the travelling speed immediately after the time instant t5 may be sometimes higher or lower than Vr if the second cross-track number Nt is larger or smaller than the expected value, as shown by the profile I or III. As a result, only the rough seeking operation is enough to provide an accurate positioning of the optical spot to the target track, thereby omitting a fine seeking period and an additional read-out period for reading the present address, unlike the conventional optical disk drive.

Figure 9:
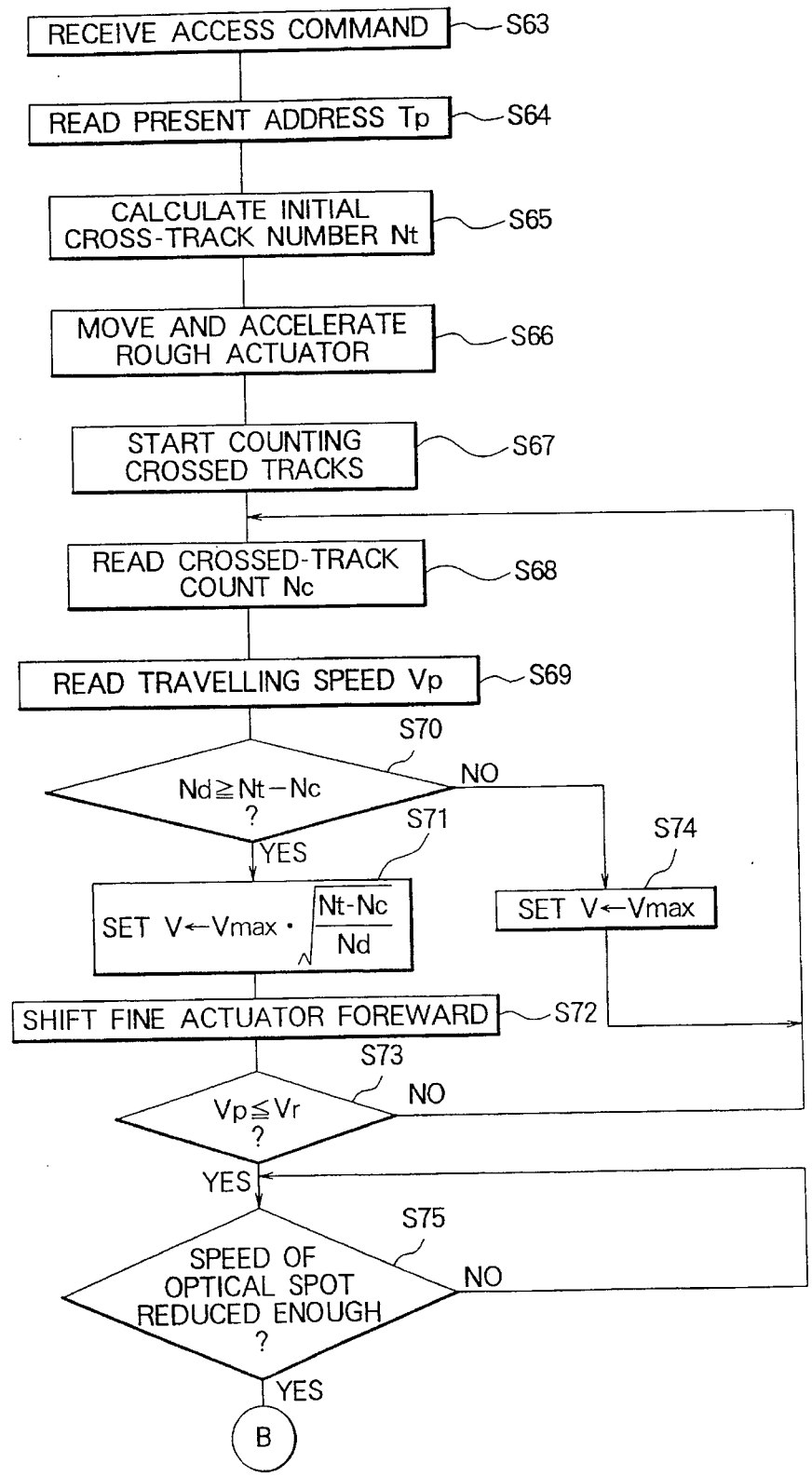
FIG. 9 is a first part of a flow chart for showing a second embodiment of the present invention similarly to FIG. 5.
Figure 10:
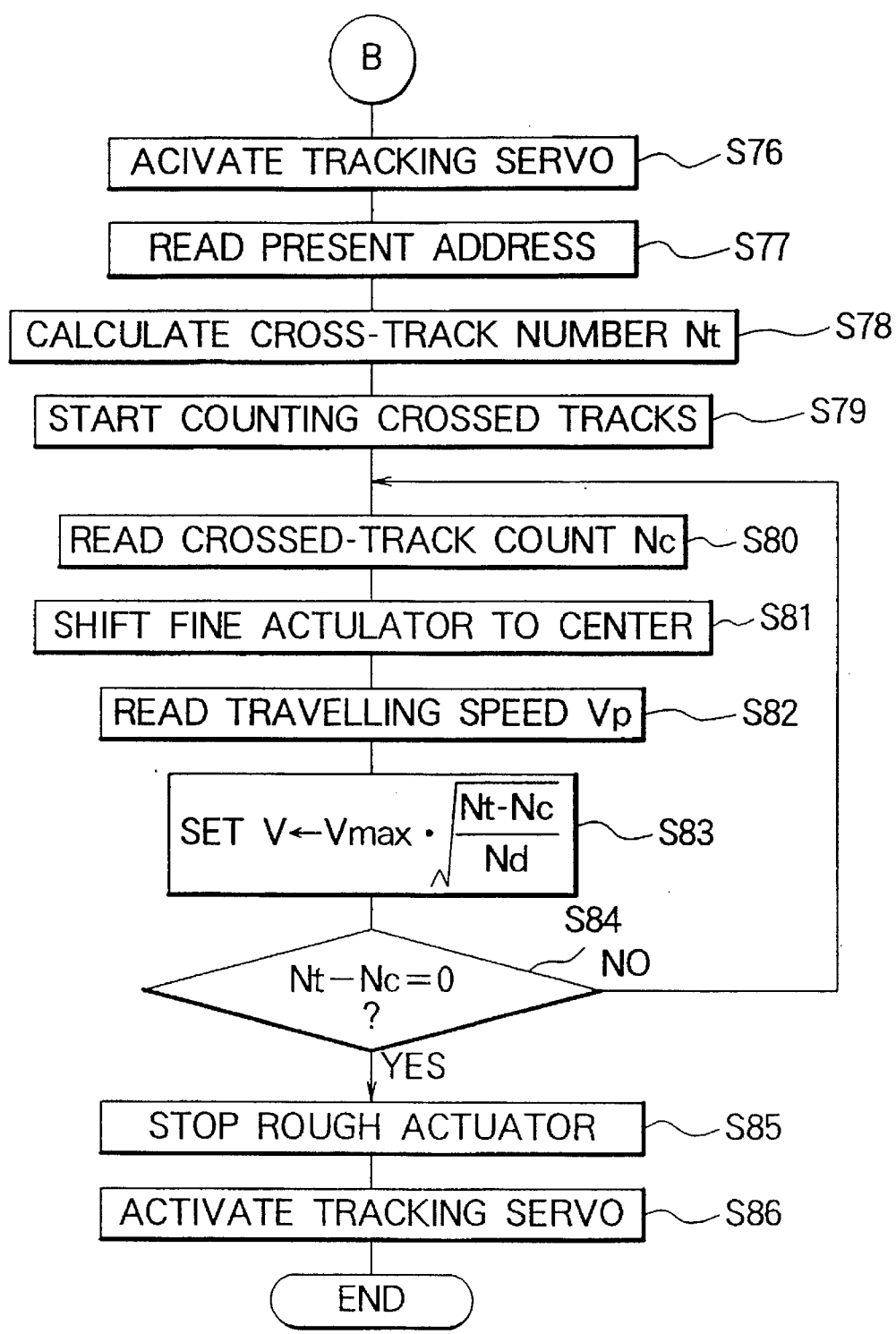
FIG. 10 is a remaining part of a flow chart of FIG. 9.
Figure 11:
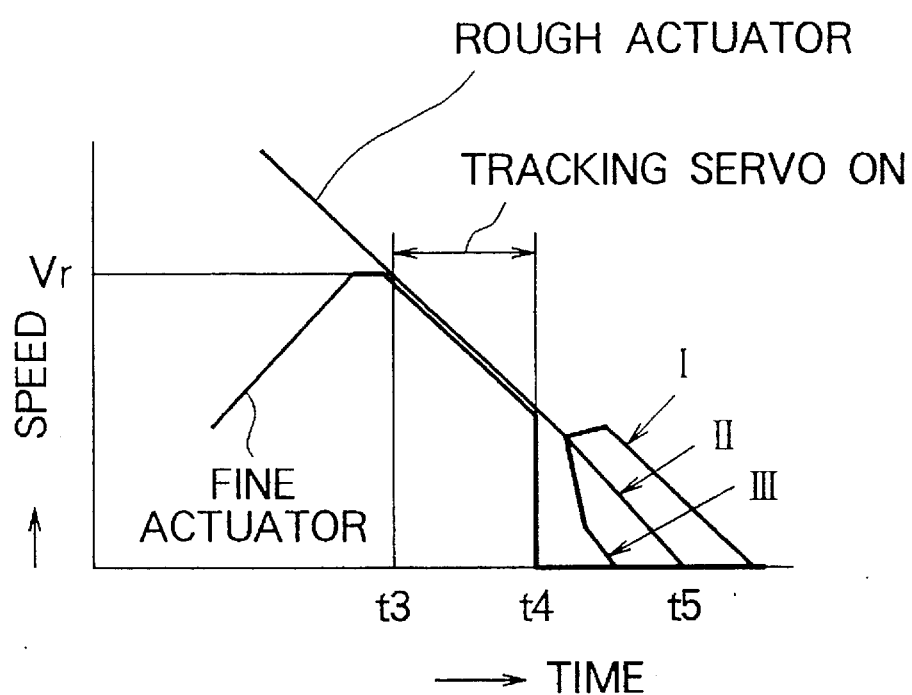
FIG. 11 is a graph for showing detailed speed profiles effected by a rough actuator and a fine actuator.

FIGS. 9 and. 10 as combined show a seeking process effected by an optical disk drive according to a second embodiment of the present invention such as shown in FIG. 4, while FIG. 11 shows detailed speed profiles effected by the rough actuator and fine actuator during the final stage of the seeking process of FIGS. 9 and 10. The steps S63 through S74 in FIG. 9 are similar to steps S17 through S28 shown in FIG. 5, and therefore, the detailed description thereof will be omitted here for avoiding a duplication. The second seeking process includes a first, acceleration period and a second, constant speed period such as shown in FIG. 7, and a third, deceleration period, as shown in FIG. 11, which is different from that of the first process shown in FIG. 8.

After the travelling speed of the optical head effected by the rough actuator becomes the threshold Vr at t3 in FIG. 11, the control section 1 maintains the drive current for driving the rough actuator at the value before t3. As a result, the travelling speed is decreased during the time interval between t3 and t4 at the constant deceleration rate approximately equal to the deceleration rate provided thereto before t3. In this state, the control section 1 controls the fine actuator 3 to move and accelerate the object lens 4A with respect to the optical head 4 in the direction opposite to the travelling direction of the optical head, thereby reducing the speed of the optical spot relative to the disk file 14 down to approximately zero.

The reduction in the relative speed is detected by a longer period of the tracking error signal. After detection of an enough reduction in travelling speed of the optical spot in step S76, the control section 1 activates the tracking servo system to read out the present address of the optical spot in step S77. Subsequently, a second cross-track number Nt to be crossed hereinafter is calculated in step S78 based the present address detected in step S77 and the target address. The cross-track counter is reset in step S79, and process cycle for revising the speed of the optical head is repeated. In this way, the travelling speeds for the subsequent time periods are repeatedly calculated based on the remaining track numbers Nt−Nc at the respective time instants in steps 80 through 84 similarly to the steps 36 through 40 in FIG. 6.

When it is detected in step S84 that the remaining track number Nt−Nc has become zero, the control section 1 controls the rough actuator 2 to stop the optical head in step S85. The control section 1 activates the tracking servo system to read the present address to assure that the present address is the target address, thereby ending the seeking process. In this way, the seeking process is completed when the rough actuator is stopped.

In accordance with the process according to the present embodiment, the read-out of the present address is executed during deceleration period for the optical head, as shown in FIG. 11. Accordingly, a constant speed period need not be interposed between the deceleration periods, unlike the process according to the first embodiment, so that the total deceleration period can be reduced compared to the first seeking process.

However, the second process includes the step for making the travelling speed of the optical spot substantially zero by providing the acceleration to the object lens in accordance with the deceleration effected to the optical head. This process requires an accurate mechanism for moving the object lens by the fine actuator.

In both the embodiments, the tracking servo system can be effectively activated to read the present address, without stopping the optical head, for correcting the speed profile of the optical spot after the read-out of the present address. As a result, an accurate positioning of the optical spot can be obtained when the operation of the rough actuator is finished, thereby omitting the fine seeking period and allowing a higher-speed seeking process for the optical spot.

Since above embodiments are described only for examples, the present invention is not limited to such embodiments and it will be obvious for those skilled in the art that various modifications or alterations can be easily made based on the above embodiments within the scope of the present invention.

What is claimed is:

1. An optical disk drive comprising an optical head for reading optical data stored along a plurality of tracks of a disk file, a first actuator for moving said optical head with respect to the disk file in a radial direction thereof, an object lens, mounted on said optical head, for irradiating an optical spot onto the disk file, a second actuator, mounted on said optical head, for moving said object lens with respect to said optical head in said radial direction, a speed sensor for detecting a radial speed of said optical spot with respect to the disk file, an address detector for detecting a present address of said optical spot with respect to the disk file, and a calculating section for calculating a speed profile for the optical head based on a stroke between a present track before seeking and a target track, said second actuator moving said object lens in the direction opposite to the moving direction of said optical head for controlling the radial speed of said optical spot to thereby generate a stationary state of said optical spot with respect to the disk file while said first actuator moving said optical head between the present track before seeking and the target track, said address detector being activated to read a present address during said stationary state of said optical spot, said calculating section correcting the calculated speed profile based on said present address obtained during said stationary state.

2. An optical disk drive as defined in claim 1 wherein said stationary state is effected during a constant speed period of said optical head.

3. An optical disk drive as defined in claim 2 wherein said stationary state of said optical spot is interposed between deceleration periods of the optical spot.

4. An optical disk drive as defined in claim 1 wherein said stationary state is effected during a deceleration period of said optical head.

5. An optical disk drive as defined in claim 1 wherein said second actuator moves, before said stationary state of said optical spot, said object lens in a forward direction as viewed in the moving direction of said optical head.

* * * * *